(12) United States Patent
Rotschild et al.

(10) Patent No.: US 11,879,632 B2
(45) Date of Patent: Jan. 23, 2024

(54) SYSTEM AND METHOD FOR GENERATING LIGHT

(71) Applicant: Technion Research & Development Foundation Limited, Haifa (IL)

(72) Inventors: Carmel Rotschild, Haifa (IL); Daria Negri, Haifa (IL); Michal Shimanovich, Haifa (IL); Matej Kurtulik, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 328 days.

(21) Appl. No.: 17/232,187

(22) Filed: Apr. 16, 2021

(65) Prior Publication Data

US 2021/0325019 A1    Oct. 21, 2021

Related U.S. Application Data

(60) Provisional application No. 63/010,766, filed on Apr. 16, 2020.

(51) Int. Cl.
| | |
|---|---|
| *F21V 5/00* | (2018.01) |
| *G02F 1/35* | (2006.01) |
| *G02F 1/365* | (2006.01) |

(52) U.S. Cl.
CPC .......... *F21V 5/002* (2013.01); *G02F 1/3528* (2021.01); *G02F 1/365* (2013.01); *F21V 2200/10* (2015.01)

(58) Field of Classification Search
CPC .... F21V 5/002; F21V 2200/10; G02F 1/3528; G02F 1/365
See application file for complete search history.

(56) References Cited

U.S. PATENT DOCUMENTS

2019/0384076 A1* 12/2019 Feke ................ G01B 9/02091

* cited by examiner

*Primary Examiner* — Anne M Hines

(57) ABSTRACT

A system for generating light, comprises a spectral light source, characterized by a spectral line shape described by a visibility function; and a multimode waveguide, characterized by an optical path difference distribution described by a standard deviation. The standard deviation typically matches, within a predetermined tolerance, a location of a zero point of the visibility function at which a contrast of the visibility function is less than 0.1.

20 Claims, 9 Drawing Sheets

(8 of 9 Drawing Sheet(s) Filed in Color)

SYSTEM AND METHOD FOR GENERATING LIGHT

RELATED APPLICATION

This application claims the benefit of priority of U.S. Provisional Patent Application No. 63/010,766 filed on Apr. 16, 2020, the contents of which are incorporated herein by reference in their entirety.

FIELD AND BACKGROUND OF THE INVENTION

The present invention, in some embodiments thereof, relates to light sources and, more particularly, but not exclusively, to a system and method for generating light with improved uniformity and improved radiance.

Two of the properties of light sources are uniformity and radiance. As the radiance is inversely proportional to the bandwidth of the light, high radiance is traditionally achieved by laser devices having a very small bandwidth. However, due to the coherence of laser light, illumination by laser is oftentimes accompanied by coherent interferences which are observed as speckles or fringes that reduce the uniformity of the illumination. Thermal light sources do not generally produce speckles, and therefore provide more uniform illumination compared to laser light. However, the radiance of thermal light sources is significantly lower due to their relatively large bandwidth.

Known in the art are techniques that provide high radiance and employ temporal averaging to reduce non-uniformity. In these techniques, a coherent beam of light is manipulated in a time-dependent manner (e.g., passed through a time-varying diffuser, reflected off a scanning mirror). The produced optical signal is then averaged over time to provide an incoherent light of improved uniformity, wherein the improvement in uniformity correlates with the overall time-period time during which the beam is manipulated.

SUMMARY OF THE INVENTION

Some embodiments of the present invention provide high radiance and low spatial coherence light sources without the need for temporal averaging. Techniques disclosed herein allow fast (short exposure) optical imaging at higher resolution and short uniform light excitation According to an aspect of some embodiments of the present invention there is provided a system for generating light. The system comprises: a spectral light source, characterized by a spectral line shape described by a visibility function; and a multimode waveguide, characterized by an optical path difference distribution described by a standard deviation. In some embodiments of the present invention the standard deviation matches, within a predetermined tolerance, a location of a zero point of the visibility function at which a contrast of the visibility function is less than 0.1.

According to some embodiments of the invention the light source is a supercontinuum light source.

According to some embodiments of the invention the multimode waveguide is embedded with a light scattering medium. According to some embodiments of the invention the light scattering medium comprises suspended particles.

According to some embodiments of the invention the light scattering medium has a refractive index that is different from a refractive index of the waveguide, wherein a difference between the refractive indices is less than 0.01. According to some embodiments of the invention the light scattering medium is selected to scatter light propagating in the waveguide at a scattering angle that is less than a numerical aperture of the waveguide. According to some embodiments of the invention the scattering angle is less than 0.1 degrees. According to some embodiments of the invention the scattering angle is less than 0.01 degrees.

According to some embodiments of the invention the waveguide has a varying geometry along a propagation direction of light through the waveguide, the varying geometry being selected to effect multiple scattering events for the light.

According to some embodiments of the invention the visibility function has a contrast less than 0.1 at an OPD of less than 100 meters. According to some embodiments of the invention the visibility function has a contrast less than 0.1 at an OPD of less than 1 meter. According to some embodiments of the invention the visibility function has a contrast less than 0.1 at an OPD of less than 10 cm.

According to some embodiments of the invention the waveguide has a graded-index profile. According to some embodiments of the invention the profile is selected such that energy gaps between optical modes are discrete and substantially equally separated.

According to some embodiments of the invention a core of the waveguide has an ergodic shape.

According to an aspect of some embodiments of the present invention there is an imaging system. The imaging system comprises the light generating system as delineated above and optionally and preferably as further detailed below.

According to an aspect of some embodiments of the present invention there is provided a lithography system. The lithography system comprises the light generating system as delineated above and optionally and preferably as further detailed below According to an aspect of some embodiments of the present invention there is provided a LIDAR system. The LIDAR system comprises the light generating system as delineated above and optionally and preferably as further detailed below According to an aspect of some embodiments of the present invention there is provided a surface profilometry system. The surface profilometry system comprises the light generating system as delineated above and optionally and preferably as further detailed below According to an aspect of some embodiments of the present invention there is provided an optical diffraction tomography system. The optical diffraction tomography system comprises the light generating system as delineated above and optionally and preferably as further detailed below According to an aspect of some embodiments of the present invention there is provided a method of generating light. the method comprises: operating a spectral light source to generate a light beam characterized by a spectral line shape described by a visibility function; and guiding the light beam by a multimode waveguide characterized by an optical path difference distribution described by a standard deviation. In some embodiments of the present invention the standard deviation matches, within a predetermined tolerance, a location of a point of the visibility function at which a contrast of the visibility function is less than 0.1.

According to an aspect of some embodiments of the present invention there is provided a method of exciting an optically excitable substance. The method comprises executing the method as delineated above and optionally and preferably as further detailed below to generate light directed to the optically excitable substance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system for generating light, which is optionally and preferably high radiance and spatially incoherent, according to some embodiments of the present invention;

FIG. 2 is a schematic illustration of an optical application system incorporating the light generating system of FIG. 1, according to some embodiments of the present invention;

FIG. 3A shows instantaneous incoherent interaction through different optical paths having optical length distribution, obtained during simulations performed according to some embodiments of the present invention;

FIG. 3B shows an optical path difference (OPD) distribution, obtained during simulations performed according to some embodiments of the present invention;

FIGS. 4A, 4B, 4C and 4D show instantaneous output of a short multimode fiber with parabolic index profile, having 50 modes (FIGS. 4A and 4C) and 100 modes (FIGS. 4B and 4D) at spatially coherent (FIGS. 4A-B) and incoherent (FIGS. 4C-D) monochromatic light interaction, as obtained during simulations performed according to some embodiments of the present invention;

FIGS. 5A and 5B show differences in propagation constant values $\beta_m$ (FIG. 5A) and intensity profiles (FIG. 5B) in the first 50 modes of a typical parabolic index profile multimode fiber, as obtained during simulations performed according to some embodiments of the present invention;

FIGS. 6A, 6B and 6C show the same modes as in FIGS. 5A-B, in terms of a time delay dT for different propagation distances and different bandwidths, as obtained during simulations performed according to some embodiments of the present invention;

FIG. 7 shows a standard deviation $\sigma_{OP}$ of a propagation constant as a function of a propagation distance z, as obtained during simulations performed according to some embodiments of the present invention;

Figure 8:
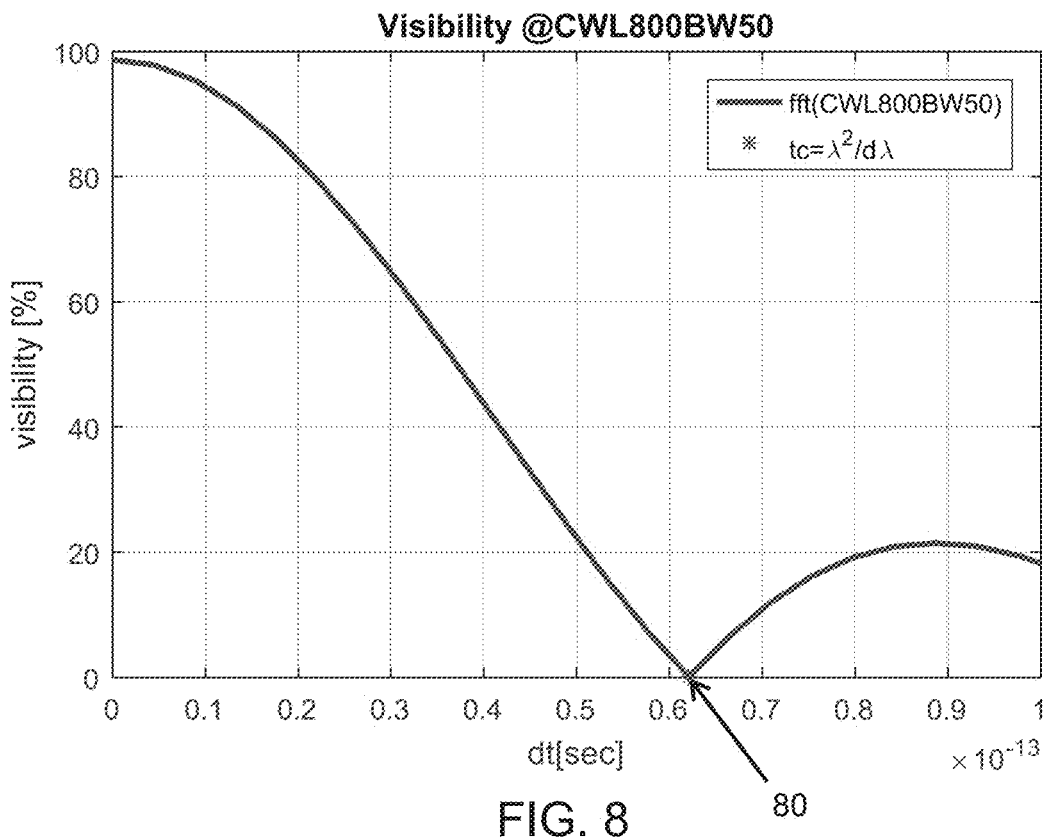
Figure 9:
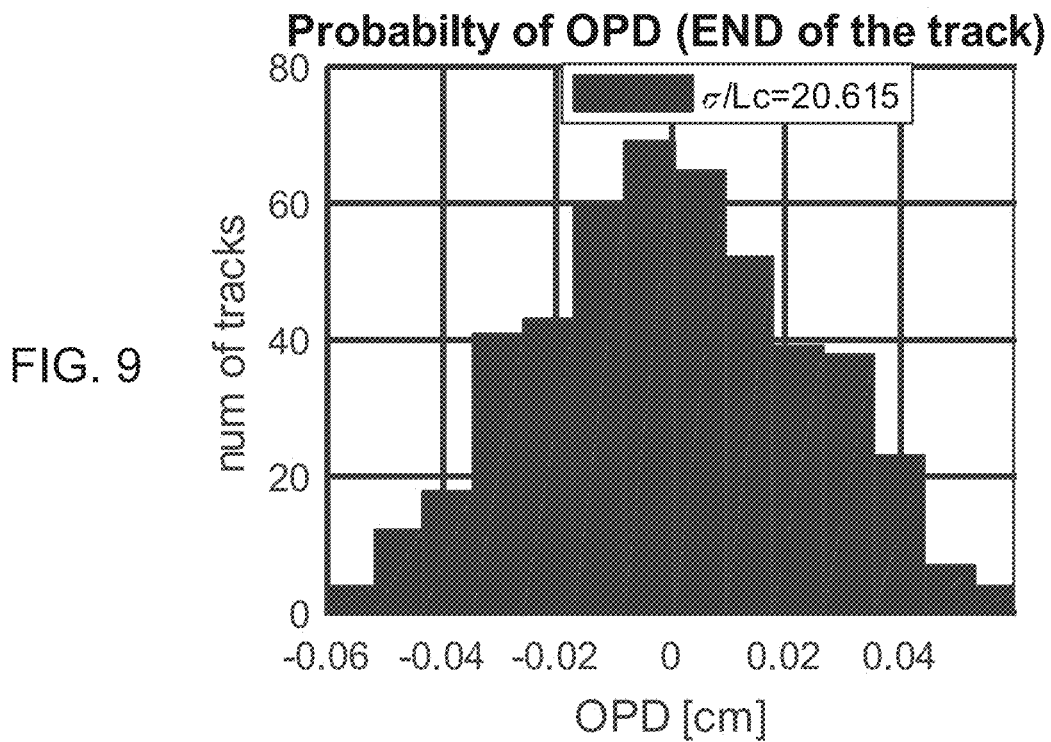

FIG. 8 shows a typical SINK visibility function (a function in the form of sin(x)/x resulting from a RECT spectral line shape (a rectangular line shape), as obtained during simulations performed according to some embodiments of the present invention; and FIG. 9 shows an OPD distribution described by a standard deviation a, as obtained during simulations performed according to some embodiments of the present invention.

DESCRIPTION OF SPECIFIC EMBODIMENTS OF THE INVENTION

The present invention, in some embodiments thereof, relates to light sources and, more particularly, but not exclusively, to a system and method for generating light with improved uniformity and improved radiance.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The technique of the present embodiments provide light that combines high uniformity with high radiance. The generated light can be used in many applications of optics, particularly applications operating near the thermodynamic limit.

The Inventors of the present invention realized that conventional solutions to the tradeoff between uniformity and high radiance values are far from being satisfactory. For example, the time averaging technique is time-consuming, wherein, typically, at least several hundreds of individual acquisitions are required for achieving adequate uniformity, thereby increasing the overall acquisition time by two or three orders of magnitude.

In a search for a solution to the aforementioned tradeoff, the Inventors discovered a technique that allows achieving high uniformity as well as high radiance at any instantaneous moment, thereby eliminating the need to employ the time-consuming technique of time averaging.

The technique exploits two unrelated physical phenomena. A first phenomenon relates to light scattering, and in particular is the stochastic outcome of multiple scattering events. A second phenomenon relates the coherence length of light sources. The Inventors demonstrated that a combination of these two phenomena can be selected to improve the uniformity without imposing a significant compromise on the irradiance. Specifically, the Inventors postulated, and experimentally demonstrated, that by effecting multiple scattering events for multiple optical modes within a waveguide, the light propagating in the waveguide evolves from a state at which the interaction between different optical paths is coherent into a state at which the interaction becomes incoherent.

Consider, for example, a quasi-monochromatic light source, having any given spectral band from about 1 nm to about 150 nm full-width-half-max (FWHM) propagating in a multimode fiber embedded with scatterers in a diffusion fashion (namely, propagating while experiencing multiple scattering events), along the Z direction. The speckled pattern changes randomly with the propagation due to the difference in propagation velocity among the different optical modes. At an optical path difference (OPD) which is lower than the coherence length, the interference is fully coherent, and so the Z-dependent random intensity pattern has a slow decrease in its contrast value C, defined as $C=(I_{max}-m_{min})/(I_{max}+I_{min})$, where $I_{max}$ and $I_{min}$ are the maximum and minimum intensities of the light over the intensity pattern. At propagation distances having longer OPD than the coherence length, some modes become incoherent and their mutual effect is the sum of their intensities, resulting in a Z-dependent random intensity pattern which exhibits a decrease in the contrast value, C. As the propagation distance and the standard-deviation of the OPD increase, more modes interact incoherently, thus further decrease in the contrast value of the Z-dependent random intensity pattern. The contrast value C is inversely proportional to the uniformity of the exit beam. In some embodiments it is desirable to achieve a high radiance source with C=0, within the exit pupil of the diffusive multimode fiber.

The Inventors found that distributing a scattering medium along with the propagation transfers energy between the propagating modes, each having different propagation velocity value, thereby increasing the evolution of the standard-deviation of the OPD between wave-packets of light propagating in each mode, resulting in a nearly fully incoherent light after a finite propagation distance and for a finite number of optical modes, at any instantaneous time. The Inventors found that incoherence after a finite propagation distance can also be achieved using a spectral light source and judicious selection of the shape of the spectral line of the light source. Specifically, the Inventors found that it is advantage to select a spectral line shape such that one of the zeroes of the Fourier transform of the spectral line shape matches the standard deviation of the OPD among wave-packets of light exiting the diffusive multi-mode fiber.

Figure 1:
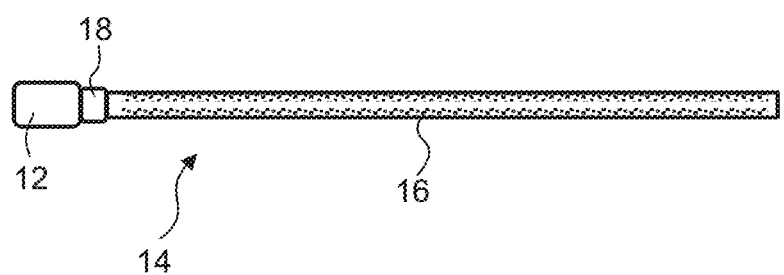

Referring now to the drawings, FIG. 1 is a schematic illustration of a system 10 for generating light, according to some embodiments of the present invention. System 10 comprises a spectral light source 12, characterized by a spectral line shape described by a visibility function.

Light source 12 can be, for example, a broadband laser source such as a supercontinuum laser, or laser driven light source (LDLS), high-intensity plasma, or Light-emitting diode (LED).

As used herein, "broadband" refers to a spectral bandwidth that is greater than about 1 nm or 10 nanometers or greater than about 100 nanometers or greater than about 200 nanometers.

In some embodiments of the present invention light source 12 is a supercontinuum light source. Supercontinuum light sources generate continuous spectra by propagation of high power pulses through nonlinear media. Such devices typically employ Photonic Crystal Fiber (PCF) to control over the dispersion properties of the nonlinear media. In a PCF a matrix of different materials with high and low refractive indices serves as a hybrid material cladding. The cladding is typically constructed with a crystal-like periodic structure. Supercontinuum light sources are particularly advantageous for the present embodiments since they combine high brightness with broad spectral coverage within a fiber.

System 10 further comprises a multimode waveguide 14. Waveguide 14 is optionally and preferably optically coupled to light source 12 such that light generated by source 12 enters into waveguide 14. Optical coupling between source 12 and waveguide 14 can optionally and preferably be ensured by an optical coupler 18. Optical coupler 18 can include any optical coupler known in the art that can in-couple two or more light beams. For example, optical coupler 18 can be a lens or lens array, a diffractive element, a dichroic mirror and the like.

Waveguide 14 may be composed of any dielectric material with a varying refractive index that is capable of guiding light. Waveguide 14 can be made of a liquid (e.g., a liquid crystal) or solid (e.g., a polymer, glass, etc.).

In some embodiments of the present invention, the waveguide has a graded-index profile. Preferably, the graded-index profile is selected such that energy gaps between optical modes are discrete and substantially equally separated (substantially equal gaps, e.g., with tolerance of less than 20% or less than 10%, between modes), such a parabolic waveguide. This is advantageous because it allows light wave-packet propagating at the high-order modes to increase OPD. This is in contrast to waveguide profiles, such as step-index where higher modes have nearly the same velocity propagation constant, which doesn't increase the OPD between wave-packet of light traveling in these high-order modes. A representative example of a graded-index profile suitable for the present embodiments is, without limitation, a parabolic profile.

The core of waveguide 14 can have any shape, including, without limitation, a rectangular shape core, an ellipsoid shape core, a circular shape core, and the like. In some embodiments of the present invention the core has an ergodic core shape. For example, the core can have a stadium shape. A representative example of a waveguide suitable for the present embodiments is described in S. Sunada, S. Shinohara, T. Fukushima, and T. Harayama, "Signature of wave chaos in spectral characteristics of microcavity lasers," Phys. Rev. Lett. 116, 203903 (2016), the contents of which are hereby incorporated by reference. The advantage of an ergodic core is that it facilitates mixing between modes with different propagation constant.

In some embodiments of the present invention multimode waveguide 14 is embedded with a light scattering medium 16. Medium 16 can be of any type capable of effecting multiple scattering events of the light modes during the propagation of the light through waveguide 14. The scattering effected by medium 16 can be according to any optical scattering phenomenon, such as, but not limited to, Mie scattering, Rayleigh scattering. Optionally, as an alternative or in addition to medium 16, the waveguide geometry varies along the propagation direction. Such variation can be selected to facilitate multipole scattering events along the waveguide 14.

Preferably, medium 16 is designed and constructed such that the scattering average angel is smaller than the angle at which total internal reflection occurs within the waveguide. For example, Mie scattering can be selected such that most of the light continues in the same direction and the scattering field is reduces with the angle according to a cosine function (zero intensity at 90° scattering). In this case, the average scattering angle is the average of the cosine square ($\cos^2(x)$) function, which, according to the present embodiments, is selected to be smaller than the total internal reflection angle of the waveguide. Such a selection ensures that light does not scatter away from the waveguide.

In some embodiments of the present invention the average scattering angle is smaller than the numerical aperture of the waveguide. The advantage of these embodiments is in that the light is confined within the waveguide and the high radiance from the light source is maintained. Preferably, the scattering angle is less than 0.1° or less than 0.01° or less than 0.001°. Smaller scattering angles are preferred because the number of scattering event increases for smaller scattering angles, and so with sufficiently small scattering angle there are many scattering events before reaching a steady-state.

Light scattering medium 16 has a refractive index that is different from the refractive index of waveguide's material. Preferably the difference between the refractive indices of the waveguide's material and medium 16 is less than 0.01, or less than 0.001, or less than 0.0001. Smaller difference between the refractive indices is preferred because the number of scattering event increases for smaller difference between the refractive indices, and so with sufficiently small difference between the refractive indices there are many scattering events before reaching a steady-state.

In some embodiments of the present invention light scattering medium 16 comprises suspended particles. Also contemplated, are embodiments in which medium 16 is printed on the wall of waveguide 14, for example, by laser printing. In these embodiments, waveguide 14 is made of a material suitable for use as a receiving substrate for laser printing.

While the embodiments above are described with a particular emphasis to a configuration in which the waveguide 14 is embedded with light scattering medium 16, it is to be understood that it is not necessary for waveguide 14 to be embedded with light scattering medium 16. The inventors found that improvement in uniformity while substantially maintaining the radiance can be achieved also without scattering within the waveguide. Preferably, when no light scattering medium is embedded in waveguide 14, the core of waveguide is of the ergodic graded-index shape type, or has a varying geometry along the propagation direction. Yet, some embodiments of the present invention contemplate employing light scattering medium 16 also when the core is of the ergodic graded-index shape type and/or when the waveguide has a varying geometry along the propagation direction.

Waveguide 14 is characterized by an optical path difference (OPD) distribution of the optical modes propagating therein. The OPD distribution is described by a standard deviation, which expresses the width of the OPD distribution curve along propagation. The OPD distribution of a fiber can be simulated by extracting the modes of an optical fiber and their propagation constant. Experimentally, the OPD can be explored for example, by propagating a monochromatic light beam through the waveguide without the scatters and measuring the contrast of the interference between light propagating in different modes.

The visibility function of the spectral line shape quantifies the contrast of fringes or speckles produced by the light generated by light source 12, through propagation. The visibility function can be represented by the Fourier transform of the spectral line shape. The Fourier transform of the spectral line shape can be obtained mathematically from the line-shape. Experimentally the visibility function (Fourier transform of the spectral line-shape) can be measured by passing the light through an interferometer and measuring the visibility as a function of the OPD between the interferometer's arms.

The inventors found that uniformity of the light at the output of waveguide 14 can be significantly improved by a judicious selection of the spectral line shape of the light source 12 and the OPD distribution of modes in the waveguide 14. Ideally, high uniformity is achieved when the standard deviation of the OPD distribution matches the location of one of the zeroes of the visibility function (Fourier transform of the spectral line shape). Such a situation, however, is rarely attainable. The Inventors demonstrated that adequate uniformity can be achieved even when the above condition is approximated and the OPD reaches a low visibility region. Thus, according to some embodiments of the present invention the standard deviation of the OPD distribution matches, within some tolerance, the location of a zero point of the Fourier transform of the spectral line shape at which the contrast of Fourier transform is sufficiently small. Mathematically, denoting the standard deviation of the OPD distribution by $\sigma$ and the visibility function by V, an improved uniformity is achieved when a point of the Fourier transform of the spectral line shape at which $V<V_{th}$ matches a value which is between $(1-\varepsilon)\sigma$ and $(1+\varepsilon)\sigma$, where $V_{th}$ is a predetermined contrast threshold value and $\varepsilon$ is a predetermined tolerance parameter. Typical values for each of $V_{th}$ and $\varepsilon$ are, independently, less than 0.1, more preferably less than 0.01, more preferably less than 0.001.

In some embodiments of the present invention the visibility function V is less than 0.1 at an OPD of less than X meters, wherein X equals 100 meters, more preferably 1 meter, more preferably 10 meter, more preferably 10 cm.

Figure 2:
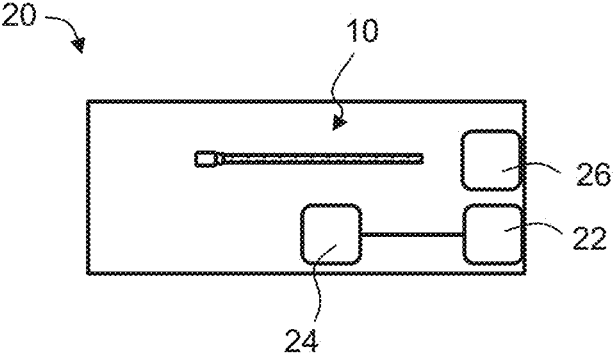

The system of the present embodiments can be used in many applications of optics, particularly, but not exclusively, generating light for imaging and excitation applications operating near the thermodynamic limit. FIG. 2 is a schematic illustration of an optical application system 20 incorporating system 10, according to some embodiments of the present invention. Optical application system 20 can be embodied as, for example, the condenser in a microscopy system, or other imaging system, a, spectroscopy system, a lithography system, a LIDAR system, a surface profilometry system, an optical diffraction tomography system, or the like.

Optical application system 20 can optionally and preferably includes, in addition to light generating system 10, an optical sensor 22 configured for sensing input light received by sensor 22 after the light has interacted with an object or a scene. When system 20 is embodied as a system that spatially resolves the input light, sensor 22 can be a pixelated sensor (e.g., a CMOS imager or a CCD). When system 20 does not resolves the input light spatially, sensor 22 need not be pixelated. System 20 can optionally and preferably comprise a signal processor 24, which receives a signal pertaining to the input light from sensor 22, processes the signal, and optionally and preferably also analyze the signal.

Optical application system 20 can optionally and preferably includes, in addition to light generating system 10, an optical manipulation system 26 for manipulating the light generated by system 10. Optical manipulation system 26 can be configured for redirecting, patterning, scanning, focusing or otherwise shaping the light. For example, optical manipulation system 26 can include a spatial light modulator, a scanning mechanism, or the like. Optical manipulation system 26 may optionally and preferably include passive optical elements, such as, but not limited to, a focusing lens, a collimator, a beam shaping lens, and the like.

When system 20 is a condenser in an imaging system, light generated by system 10 is directed to an object (not shown), and interacts (e.g., reflected, scattered, refracted, diffracted) with the object. Following the interaction, the light is received by sensor 22 which resolves it spatially and optionally and preferably also spectrally (when color imaging or spectral or hyperspectral imaging is desired). Sensor 22 generates a signal pertaining to the received light, and processor 24 processes the signal and generates an image which can be displayed on a display device (not shown) or transmitted to a remora location. When system 20 is a LIDAR system, processor 24 also determines a range to the object or to individual points on the object, using any technique known in the art (e.g., time-of-flight, structured light, and the like).

When system 20 is a surface profilometry system, light generated system 10 is directed to a surface of an object (not shown), and reflected or scattered off the surface. Processor 24 processes the signal from sensor 22 and determines the range to each point on the surface as a function of transverse coordinate.

When system 20 is a spectroscopy system, light generated by system 10 is directed to an object (not shown), and interacts (e.g., reflected, scattered, refracted, diffracted) with, or absorbed by, the object. Processor 24 processes the signal from sensor 22, analyzes the spectral content of the input light, and generates an output indicative of the spectrum of the light. Processor 24 can optionally and preferably also determine the structure and/or composition of the object based on the spectrum, and generate an output also pertaining to this structure and/or composition.

When system 20 is a lithography system, light generated by system 10 is passed through optical manipulation system 26 which directs the light to a photosensitive surface (not shown) and generates an optical pattern on the surface, by spatially modulating the light beam exiting system 10 and/or scanning the surface with the light beam. Photosensitive species on the surface interact with the light and form a lithography pattern corresponding to the optical pattern. In these embodiments, it is not necessary for system to include sensing system 22 and processor 24.

When system 20 is an optical diffraction tomography system, light generated by system 10 is directed to an object (not shown), and is diffracted off the object. System 20 optionally and preferably acquires the diffracted light for multiple angles of incident of them light on the object, for example, by means of optical manipulation system. Processor 24 processes the signal from sensor 22, and analyzes the intensity signal as a function of the incident and diffracted angles, and generates an output pertaining to the analysis. In some embodiments of the present invention processor 24 also determines the structure of the object based on the angle-dependences of the intensity, and generates an output pertaining to the determined structure.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

This Example demonstrates a diffusing mechanism that generates high-radiance fully incoherent light at any instantaneous moment. This can be efficient in imaging systems, excitation sources, and other fields of optics where uniform high radiance illumination is required.

The concept is based on two unrelated mechanisms, random walk describing a diffusion process and the coherence length. In a random walk, the average path length increases with time, and standard-deviation of the path-length, $\sigma_{pl}$, describing the statistical-ensemble of random walks, also increases with time.

In a uniform medium, light diffracts according to Helmholtz equation. By adding weak random scatters along the light path the evolution of the full-width-half max (FWHM) of the beam shifts from diffraction to diffusion. Further increase in the scattering cross-section results in Anderson localization where the light propagates without broadening.

Figure 3A:
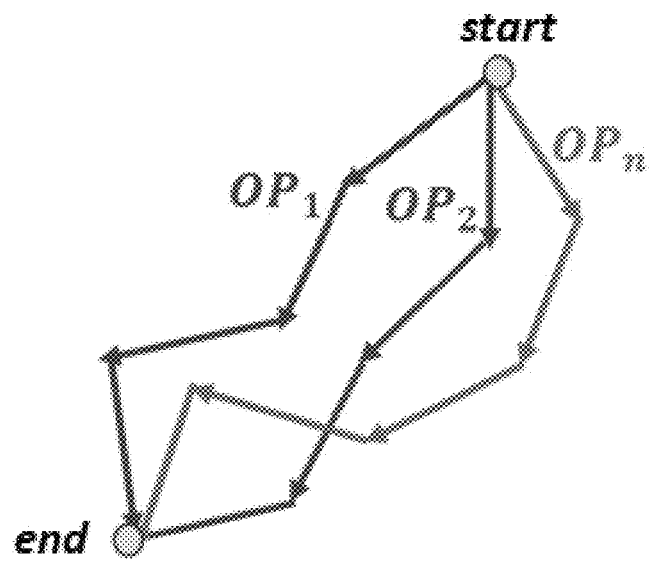
Figure 3B:
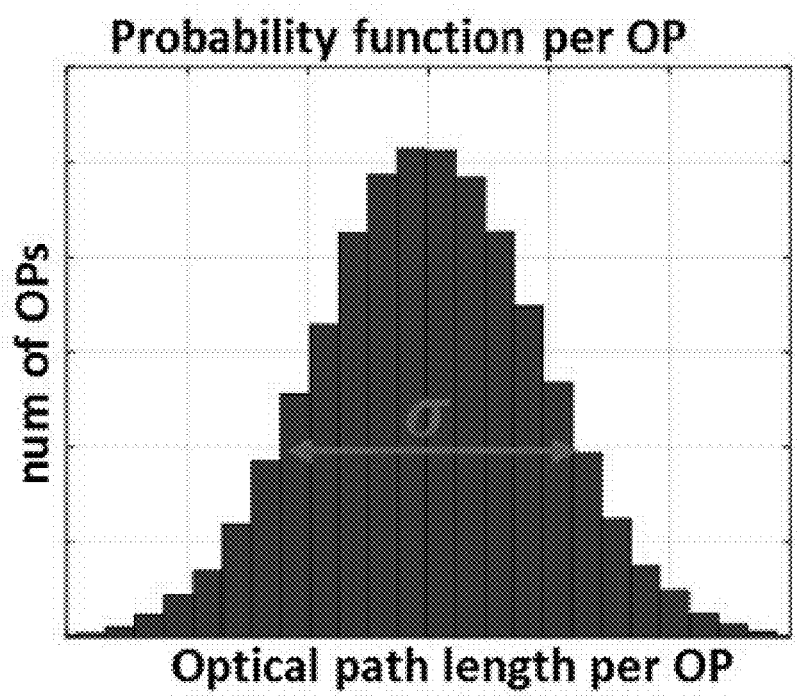
Figure 4A:
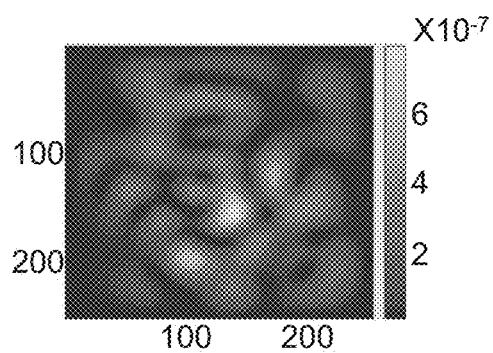
Figure 4B:
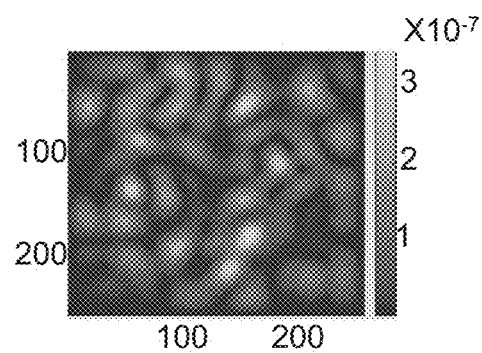
Figure 4C:
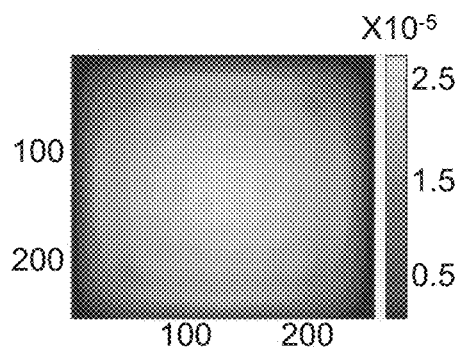
Figure 4D:
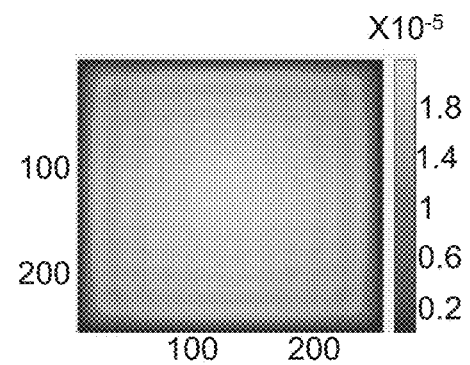

For light propagating in a fiber having random diffusers embedded in it, the difference in path-length and light velocity between high-order adjacent modes becomes smaller and smaller. While at short propagation distance mainly low-order-modes incoherently interact, a fully incoherent light is achieved only at an infinite distance of the fiber. The Inventors found a solution to this problem by designing the scatters along with the propagation, such that energy is transferred between modes. This averages the evolution of $\sigma_{pl}$ between the modes, resulting in a zero visibility value of the light after a finite distance, for a finite number of modes. FIG. 3A depicts the concept. Shown in FIG. 3A is instantaneous incoherent interaction through different optical paths having optical length distribution. FIG. 3B shows an OPD distribution as a histogram of the number of optical paths as a function of the optical path length per optical path. Also shown is the standard deviation σ of the OPD. After sufficient random scattering, σ becomes longer than the coherence length, resulting in incoherent interaction.

In some embodiments of the present invention the light generating system includes a multi-mode waveguide, so as to maintain high radiance. In a multi-mode waveguide, the dispersion relation, which defines the difference in propagation velocity of each mode, $\beta_m$, varies with the mode number, so that the evolution of light from spatially coherent into spatially incoherent can be obtained. An additional advantage of multi-mode waveguide is that the beam is less broadened with propagation, maintaining a desired high average intensity at the output. Within the waveguide, the only reduction, in contrast, is due to the evolution of the multi-modes from coherent to incoherent interaction. For example, in a short multimode waveguide at a length $L \ll L_c$, the random speckled pattern changes with propagation due to the difference in $\beta_m$, but the average speckle size and the contrast remain constants as the interaction is fully coherent. FIGS. 4A-D compare the instantaneous output of a short, $L \ll L_c$, multimode fiber with parabolic index profile, having 50 modes (FIGS. 4A and 4C) and 100 modes (FIGS. 4B and 4D) at spatially coherent (FIGS. 4A-B) and incoherent (FIGS. 4C-D) light interaction. Note, that even though the incoherent light shows a non-uniform pattern, this is the lower possible limit on the C value for such a small number of modes defined by the numerical aperture (NA) of the fiber. That is the contrast reduction that can be achieved is $C=1/N$, where N is the number of modes in the multi-mode fiber.

Figure 5A:
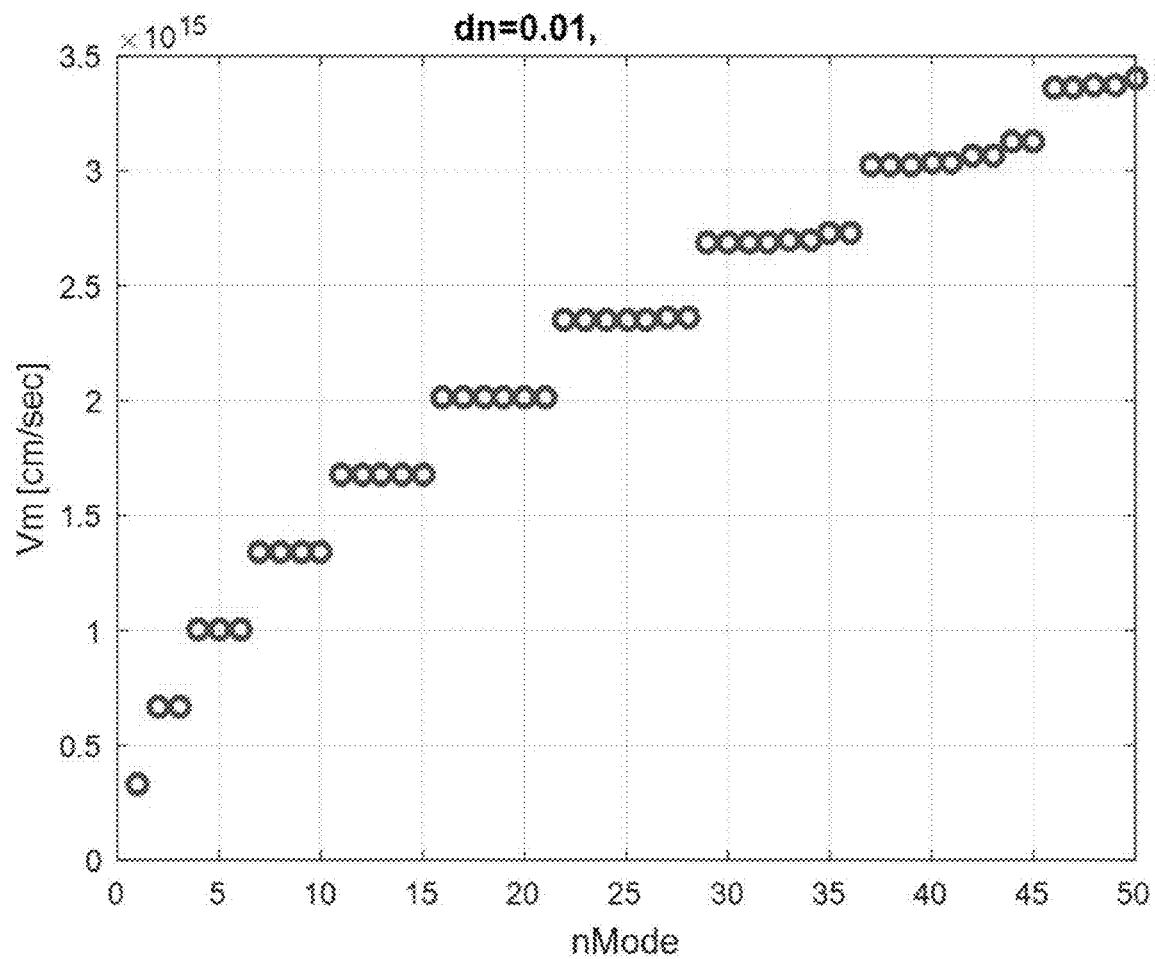
Figure 5B:
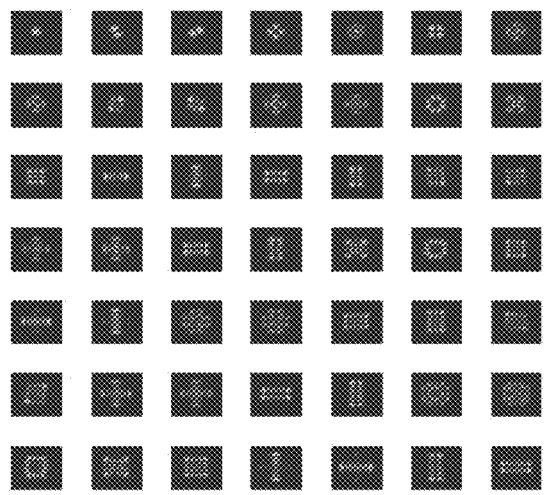

FIGS. 5A and 5B show the difference in propagation constant values $\beta_m$, (FIG. 5A) and the intensity profile (FIG. 5B) in the first 50 modes of a typical parabolic index profile multimode fiber. As shown, $\beta_m$ strongly varies at the low modes, and slowly varying at high modes.

Figure 6A:
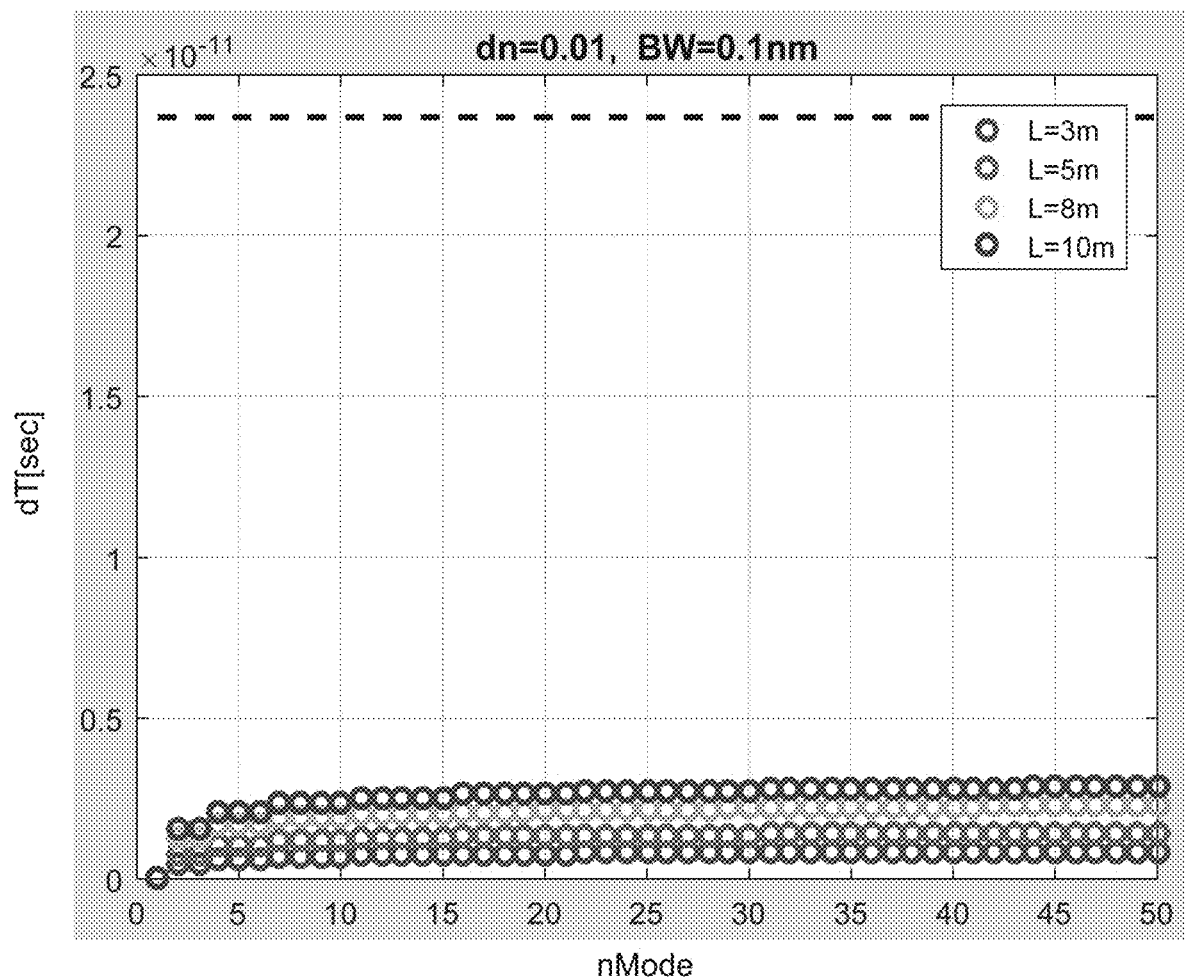
Figure 6B:
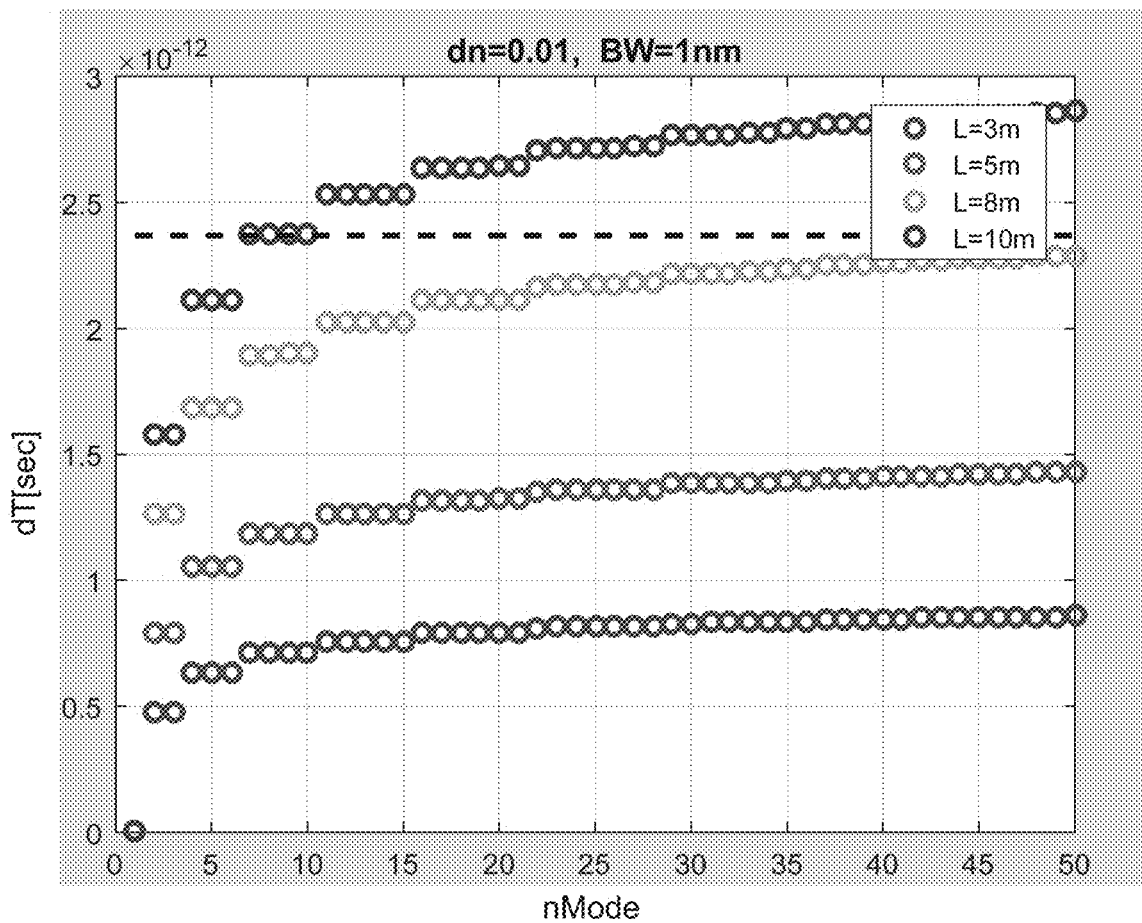
Figure 6C:
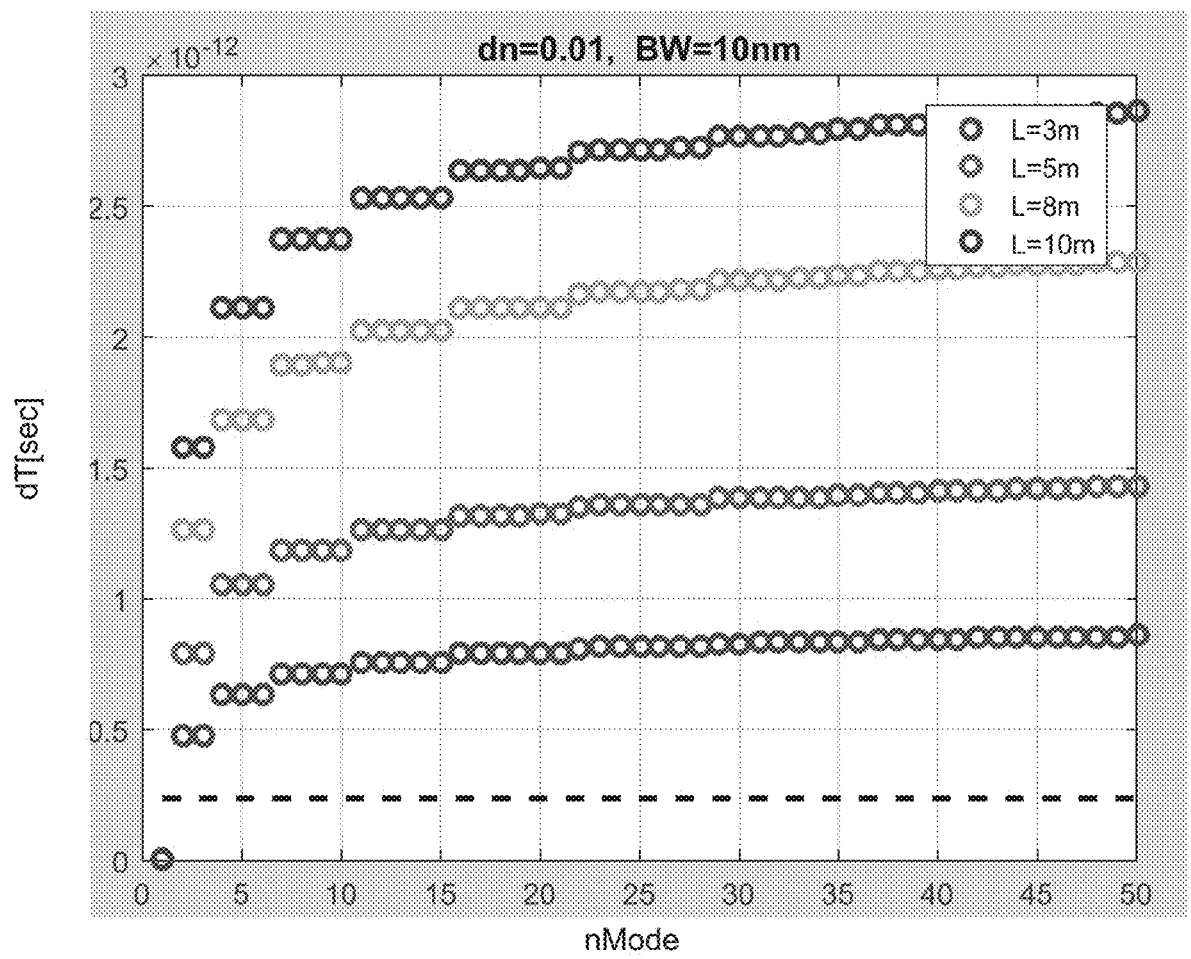

FIGS. 6A-C show the same modes as in FIGS. 5A-B, in terms of the time delay dT after 3 (blue), 5 (red), 8 (yellow), and 10 (purple) meters of propagation. For comparison, the dashed black line shows the coherence time, $\tau c = L_c/c$, as a function of Δλ the bandwidth Δλ for 700±0.05 nm (FIG. 6A), 700±0.5 nm (FIG. 6B) and 700±5 nm (FIG. 6C). $\tau_c$ is the limit of dT between two modes for which the interaction is considered as incoherent. FIG. 6A demonstrates that the relatively spectrally coherent light source, ±0.05 nm that propagate a distance of 10 meters in the exemplary fiber remains fully coherent, as all the modes do not gain relative delay greater than $\tau_c$. FIG. 6B indicates that only a few modes gain sufficient path difference after 10 meters of propagation, and FIG. 6C (bandwidth ΔΛ of 10 nm) shows that 10 meters of propagation are sufficient only between a few modes. Thus, it is preferred that the source spectral band be sufficiently broad, preferably broader than 10 nm, in order to maintain the fiber short.

Figure 7:
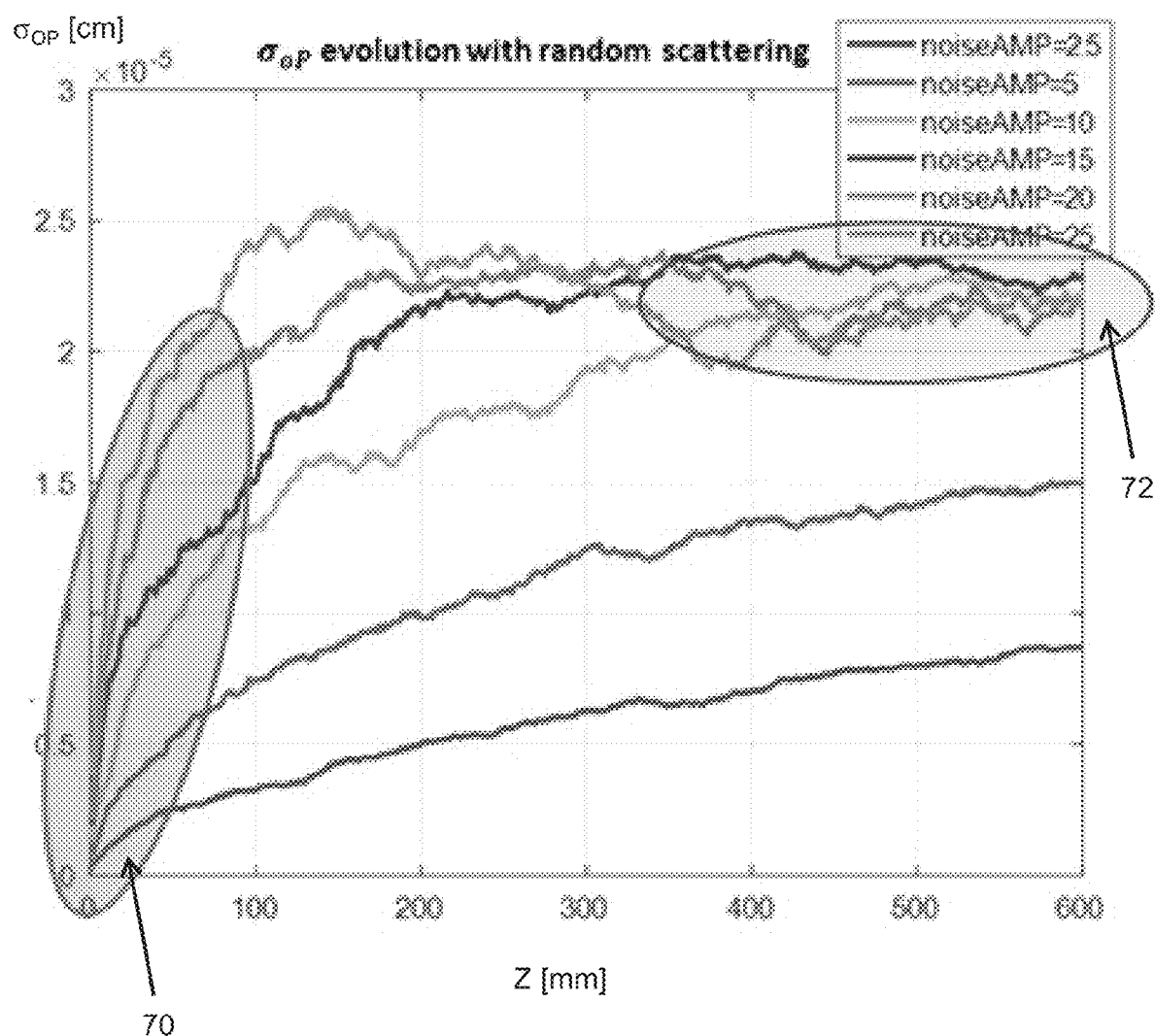

During propagation in the fiber with a scattering medium, the light occupies higher modes by diffusion. After a certain distance, while all modes populated the evolution of optical path difference between the modes converges. FIG. 7 depicts this evolution. Shown is the standard deviation $\sigma_{OP}$ of the propagation constant (e.g., velocity) as a function of the propagation distance z. As shown, $\sigma_{OP}$ increases only at the initial diffusion section (marked by reference sign 70). Once diffusion reaches a steady-state (marked by reference sign 72), the standard deviation stops increasing.

The present embodiments contemplate use of spectral line shaping for reducing the coherence, hence improving the uniformity. The Fourier transform of the spectral line shape is the visibility function. According to some embodiments of the present invention the diffusion dynamics and the spectral line-shape are selected such that the standard deviation of the OPD distribution matches, within some tolerance, the location of a point of the Fourier transform of the spectral line shape at which the contrast of Fourier transform is sufficiently small.

FIG. 8 shows a typical SINK visibility function (a function in the form of sin(x)/x resulting from a RECT spectral line shape (a rectangular line shape). The visibility function exhibits a zero the location of which is marked by reference sign 80. The zero value of the visibility function is the optical path difference for which the interference patterns (e.g., fringes) have zero contrast. In FIG. 8, the zero visibility depicts in units of time, and the zero distance is scaled using the average light velocity Tailoring the standard deviation of the optical path difference to be equal to the zero-visibility value eliminates fringes (poor visibility). In FIG. 8, the zero visibility at 0.63 s between modes with an average refractive index of 1.6 corresponds to OPD of 11 micron, demonstrating that zero visibility can be matched with the standard deviation of the OPD distribution. FIG. 9 shows the OPD distribution described by a standard deviation σ satisfying σ/Lc=20.615. The OPD of about 400 microns is much larger than the 11 microns. A fiber having a length which is about 10% of the length of the fiber having the OPD distribution as in FIG. 9 matches the zero viability function of the light source depicted in FIG. 8.

It is to be understood that it is not necessary for the line shape to be characterized by a RECT function, and that other line shape functions are also contemplated. For example, a SINK spectral line shape can be used, in which case the resulting visibility function is a RECT visibility function. The advantage of this embodiment is that the RECT visibility function allows a broad range of values for the standard deviation of the OPD distribution, at a comparably short waveguide.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for generating light, comprising:
a spectral light source, characterized by a spectral line shape described by a visibility function; and
a multimode waveguide, characterized by an optical path difference distribution described by a standard deviation $\sigma$;
wherein a location of a zero point of said visibility function at which a contrast of said visibility function is less than 0.1 has a value which is about the same as a value of said standard deviation.

2. The system according to claim 1, wherein said light source is a supercontinuum light source.

3. The system according to claim 1, wherein said multimode waveguide is embedded with a light scattering medium.

4. The system according to claim 3, wherein said light scattering medium comprises suspended particles.

5. The system according to claim 3, wherein said light scattering medium has a refractive index that is different from a refractive index of said waveguide, wherein a difference between said refractive indices is less than 0.01.

6. The system according to claim 3, wherein said light scattering medium is selected to scatter light propagating in said waveguide at a scattering angle that is less than a numerical aperture of said waveguide.

7. The system according to claim 6, wherein said scattering angle is less than 0.1 degrees.

8. The system according to claim 1, wherein said waveguide has a varying geometry along a propagation direction of light through said waveguide, said varying geometry being selected to effect multiple scattering events for said light.

9. The system according to claim 1, said visibility function has a contrast less than 0.1 at an OPD of less than 100 meters.

10. The system according to claim 1, wherein said waveguide has a graded-index profile.

11. The system according to claim 10, wherein said profile is selected such that energy gaps between optical modes are discrete and substantially equally separated.

12. The system according to claim 1, wherein a core of said waveguide has an ergodic shape.

13. An imaging system, comprising the system of claim 1.

14. A spectroscopy system, comprising the system of claim 1.

15. A lithography system, comprising the system of claim 1.

16. A LIDAR system, comprising the system of claim 1.

17. A surface profilometry system, comprising the system of claim 1.

18. An optical diffraction tomography system comprising the system of claim 1.

19. A method of generating light, comprising:
operating a spectral light source to generate a light beam characterized by a spectral line shape described by a visibility function; and
guiding said light beam by a multimode waveguide characterized by an optical path difference distribution described by a standard deviation $\sigma$;
wherein a location of a point of said visibility function at which a contrast of said visibility function is less than 0.1 has a value which is about the same as a value of said standard deviation $\sigma$.

20. A method of exciting an optically excitable substance, comprising executing the method of claim 19 to generate light directed to the optically excitable substance.

* * * * *